Jan. 30, 1968  E. L. YOUNG  3,366,869

INDUCTION TYPE GENERATOR CONTROL CIRCUIT

Filed Nov. 19, 1964

INVENTOR.
Elmer L. Young
BY
His Attorney

United States Patent Office 3,366,869
Patented Jan. 30, 1968

3,366,869
INDUCTION TYPE GENERATOR
CONTROL CIRCUIT
Elmer L. Young, Englewood, Ohio, assignor to General
Motors Corporation, Detroit, Mich., a corporation of
Delaware
Filed Nov. 19, 1964, Ser. No. 412,435
1 Claim. (Cl. 322—46)

ABSTRACT OF THE DISCLOSURE

An induction type generator control system wherein the primary winding of a first control transformer is connected across the series connected output windings and the primary winding of a second control transformer is connected in series with the output windings. The secondary winding of each of these transformers is shunted by a capacitor. Two series connected capacitors are also connected across the two series connected output windings and an excitation winding is connected between the junction of the two series connected output windings and the series connected capacitors.

This invention relates to controlled voltage induction generator excitation, and, more particularly, to an inexpensive yet rugged arrangement of components for use thereof as an engine generator, starter motor and the like.

Provision of a separate exciter means can add considerable cost for material and complexity in circuitry on induction-type dynamoelectric machines.

Accordingly, an object of the present invention is to provide a multi-purpose machine which can be used to generate power, as a plug-in electric starter for power tools such as lawnmower gasoline engine for example as well as elsewhere.

Another object of this invention is to provide arrangement of components for controlled voltage induction generator excitation using a permanent magnet means mounted on a rotor shaft using at least a pair of capacitor means connected to stator windings to supply load power including a series transformer-capacitor means combination to keep generator voltage level under running load current and at the time of motor starting current surges.

Another object of this invention is to provide arrangement of components for controlled voltage induction generator excitation using a permanent magnet means mounted on a rotor shaft and using at least a pair of capacitor means connected to stator windings and further capacitor means connected through a variable transformer means across a pair of stator windings connected to each other at a centrally located juncture to supply load power including a series transformer-capacitor means combination to keep generator voltage level under running load current and at the time of load motor starting current surges.

A further object of this invention is to provide a rotor means arrangement including a shaft carrying a laminated core having a squirrel cage winding portion as well as a disc-shaped permanent magnet portion on the shaft axially adjacent to the squirrel cage winding portion to be supplied with sufficient magnetism to guarantee voltage buildup for controlled voltage induction generator excitation using a permanent magnet means mounted on a rotor shaft and using at least a pair of capacitor means connected to stator windings to supply load power including a series transformer-capacitor means combination to keep generator voltage level under running load and at the time of load motor starting current surges.

Another object is to provide in combination a rotor means arrangement including a shaft carrying a laminated core having a squirrel cage winding portion as well as a disc-shaped permanent magnet portion on the shaft assembly adjacent to the squirrel cage winding portion to be supplied with sufficient magnetism to guarantee voltage buildup for controlled voltage induction generator excitation using the permanent magnet means mounted on the rotor shaft and using at least a pair of capacitor means connected to stator windings and further capacitance means connected through a variable transformer means across a pair of stator windings connected to each other at a centrally located juncture to supply load power including a series transformer-capacitor means combination to keep generator voltage level under load and at the time of load motor starting current surges.

Further objects and advantages of the present invention will be apparent from the following description, reference being had to the accompanying drawings wherein preferred embodiments of the present invention are clearly shown.

Figure 1:
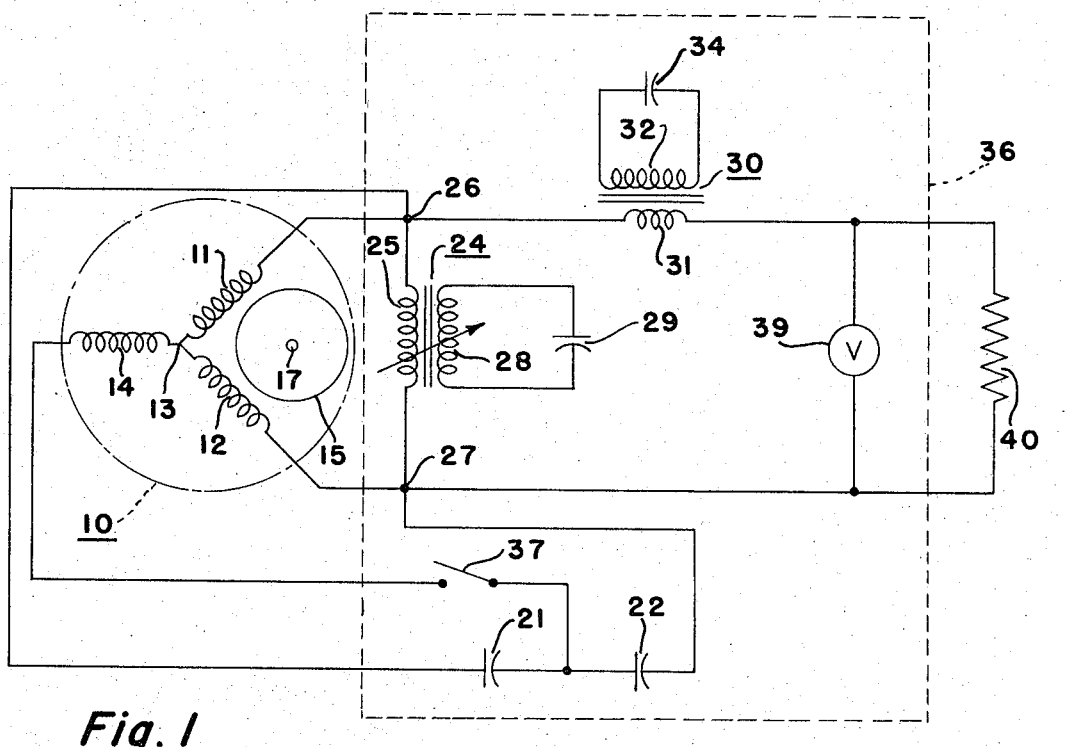
FIGURE 1 is a wiring diagram for controlled voltage induction generator means having features in accordance with the present invention.
Figure 2:
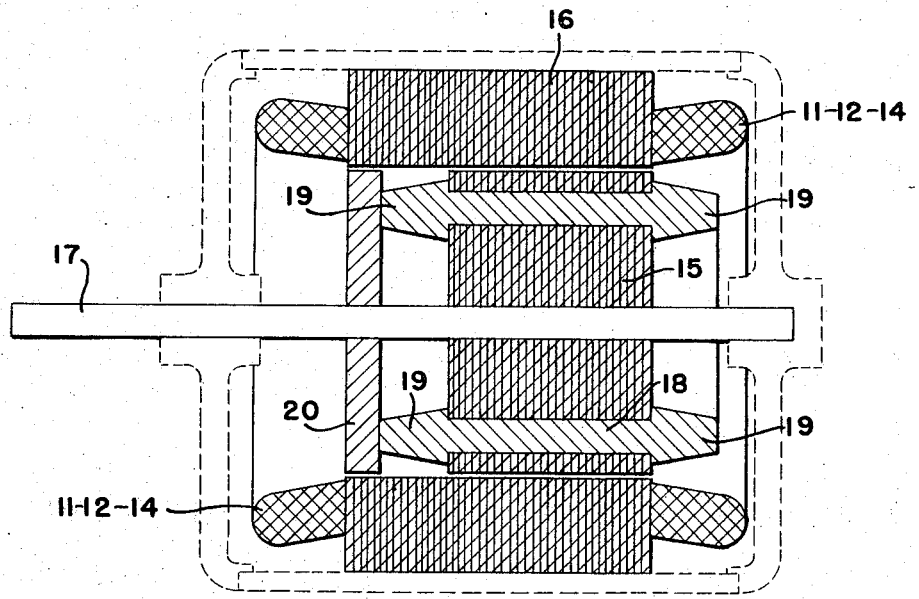
FIGURE 2 is an axially cross-sectioned view of rotor means used in FIGURE 1.

In FIGURE 1 there is shown a dynamoelectric machine or alternator generally indicated by numeral 10 to be used as a rugged induction generator that overcomes disadvantages previously known for this type of generator. The alternator includes a pair of winding portions 11 and 12 connected to each other at a juncture 13 and being in series to provide a power output of predetermined value such as 120 volts. An additional winding portion 14 has one end thereof also attached to the juncture 13 and is the main excitation winding adapted for a higher voltage to permit use of a higher voltage and more economical capacitors. Also shown in the circuitry of FIGURE 1, are main exciting capacitors 21 and 22 which utilize all three generator windings 11, 12 and 14 to provide excitation. A rotor means 15 is included with the alternator 10 also having a magnetic stator core 16 to carry the windings 11, 12 and 14 in a well known manner. The rotor is carried by a shaft 17 journalled in a well known manner. The rotor includes a squirrel cage winding portion 18 as well as opposite end ring means 19. The squirrel cage rotor winding includes conductor bars of non-magnetic metal such as aluminum and the end rings are formed integrally therewith in a well known manner. An annular or disc-shaped permanent magnet means 20 is also carried by the shaft 17 in a location axially immediately adjacent to one side of the rotor 15 as shown in FIGURE 2.

The permanent magnet member 20 is provided to assure initial excitation and to overcome customary insufficiency of residual magnetism of induction generators to build up voltage. As shown in FIGURE 2, the stator magnetic core 16 with its windings is extended axially so as to be magnetically influenced by the permanent magnet member 20. The permanent magnet member 20 supplies enough magnetism to guarantee voltage build-up.

Further in accordance with the present invention, a variable transformer means 24 is provided to permit adjustment of output voltage by having a connection of one portion 25 thereof to junctures 26 and 27 across which the coil portions 11 and 12 are connected in series and also the main exciting capacitors 21 and 22 are connected in series with each other and in parallel with the winding portions noted. Another portion 28 of the variable transformer means 24 has a capacitor means 29 connected thereto at opposite ends thereof for supplying voltage adjustment excitation through the variable transformer means 24. The transformer means 24 is optional since voltage regulation would be good even without it. However if used, the transformer means 24 of the variable type is to have a rating substantially equal to ten percent of the generator rating so as to permit a ten percent adjustment.

A transformer-capacitor combination generally indicated by numeral 30 includes a series connected coil portion 31 between juncture 26 and a load means 40. The transformer means 30 also includes a coil portion magnetically coupled to the coil portion 31 and designated by a reference numeral 32. This coil portion 32 has a capacitor means 34 connected to opposite ends thereof. The combination of transformer means 30 and capacitor 34 keeps the generator voltage level under load and, at the time of load motor starting, current surges. The capacitor means 34 supplies excitation to counter the demagnetizing effect of load currents. It is also possible to use a capacitor means such as 34 directly in series with the power line without the transformer means 30. When the transformer means 30 is used, it is to reduce the cost and size of the capacitor means 34. The transformer means 30 is a current-transformer type with a rating of kilovolt amperes of about five percent that of the generator means.

Preferably all components except the induction generator itself would be mounted in a control box indicated by a reference numeral 36 in FIGURE 1. The box could be separate or mounted directly on the induction generator and a switch means 37 would be mounted in the control box in such a manner that when the door to the control box is open the switch would be open to break the circuitry as indicated. This is a safety feature because of the high voltage at the exciting capacitors. It is to be noted that this switch 37 does not open the power circuit but rather interrupts the excitation to an extent that there would be no high voltages. The switch 37 is connected in series with the coil portion 14 to a juncture between the main exciting capacitors 21 and 22 as shown in FIGURE 1. A closed circuitry through the capacitors 21 and 22 remains so that a high charge does not remain on the capacitors.

A voltage indicator or meter means 39 can be provided across the load 40. It is to be noted that the arrangement in the circuitry of FIGURE 1 contains components of a capacitor run motor. Thus, the alternator can be used as a dual purpose machine. For example, it can be used as a plug-in electric starter for a lawnmower gasoline engine. Also in case of power failure there can be manual starting of a gasoline or internal combustion engine so that the alternator can be used as an engine generator for electricity. This arrangement has the advantage over conventional alternators in that no exciter is needed and there are no rotor windings other than the conventional squirrel cage portion as indicated. Such a rotor can be used with speeds up to 40,000 r.p.m. The features of the present invention can be used for either explosion proof or hermetically sealed installations.

While the embodiments of the present invention as hereing disclosed constitute preferred forms, it is to be understood that other forms might be adopted.

What is claimed is as follows:

1. An induction type generator control circuit comprising in combination with at least two series connected output windings, first and second transformers having primary and secondary wndings, means for connecting said primary winding of said first transformer in shunt across said series connected output windings, means for connecting said primary winding of said second transformer in series with said output windings, first and second capacitors, means for connecting said first and second capacitors in shunt across the said secondary windings of said first and second transformers, respectively, third and fourth capacitors, means for connecting said third and fourth capacitors in series across said series connected output windings, an excitation winding and means for connecting said excitation winding between the junction between said series connected output windings and the junction between said series connected third and fourth capacitors.

References Cited
UNITED STATES PATENTS

| | | | |
|---|---|---|---|
| 2,609,528 | 9/1952 | Reijnst et al. | 322—46 |
| 2,689,327 | 9/1954 | Haas | 322—46 |
| 2,949,553 | 8/1960 | Benoit | 310—211 |

MILTON O. HIRSHFIELD, *Primary Examiner.*

R. V. LUPO, *Assistant Examiner.*